Sept. 4, 1945.  E. WOLF  2,384,059
POWER OPERATED INDUSTRIAL LIFT TRUCK
Filed Jan. 29, 1943   4 Sheets-Sheet 1

INVENTOR
*Ed. Wolf*

ATTORNEYS

Sept. 4, 1945.  E. WOLF  2,384,059

POWER OPERATED INDUSTRIAL LIFT TRUCK

Filed Jan. 29, 1943  4 Sheets-Sheet 2

INVENTOR
*Ed. Wolf*
BY
ATTORNEYS

Sept. 4, 1945.  E. WOLF  2,384,059
POWER OPERATED INDUSTRIAL LIFT TRUCK
Filed Jan. 29, 1943  4 Sheets-Sheet 3

INVENTOR
Ed. Wolf
BY
ATTORNEYS

Sept. 4, 1945.  E. WOLF  2,384,059
POWER OPERATED INDUSTRIAL LIFT TRUCK
Filed Jan. 29, 1943  4 Sheets-Sheet 4

INVENTOR
Ed. Wolf
BY
ATTORNEYS

Patented Sept. 4, 1945

2,384,059

UNITED STATES PATENT OFFICE 2,384,059

POWER-OPERATED INDUSTRIAL LIFT TRUCK

Edward Wolf, Stockton, Calif.

Application January 29, 1943, Serial No. 473,963

6 Claims. (Cl. 180—53)

This invention relates to load lifting trucks for use in garages, warehouses and the like to lift and maneuver or transport motor vehicles and other loads; the principal object being to provide a truck for the purpose having what I believe to be novel drive mechanisms for truck propulsion and for operating the lifting apparatus, and control means for the mechanisms arranged so that they may be placed in operation independently or simultaneously in a quick and easy manner by the operator stationed on the truck.

A further object is to provide a novel propulsion means for the trucks which includes a pair of drive wheels turnable as a unit about a vertical axis, and a manual means to control such turning so as to steer the truck and also, if desired, reverse the direction of travel of the truck without actually reversing the direction of rotation of the drive shaft.

The truck as a whole between the front and rear wheels is relatively long and includes a rear power unit and a front load lifting and carrying unit; and a further object is to connect the two units so that while they are held rigid longitudinally they may swivel laterally relative to each other so that the front and rear wheels may accommodate themselves to any inequalities in the floor or ground level without tending to twist the framework of the truck, and without having to mount the wheels on individual springs or other relatively yieldable supporting means.

These objects I accomplish by means of such structure and relative arrangement of parts as will fully appear by a perusal of the following specification and claims.

In the drawings similar characters of reference indicate corresponding parts in the several views.

Figure 1:
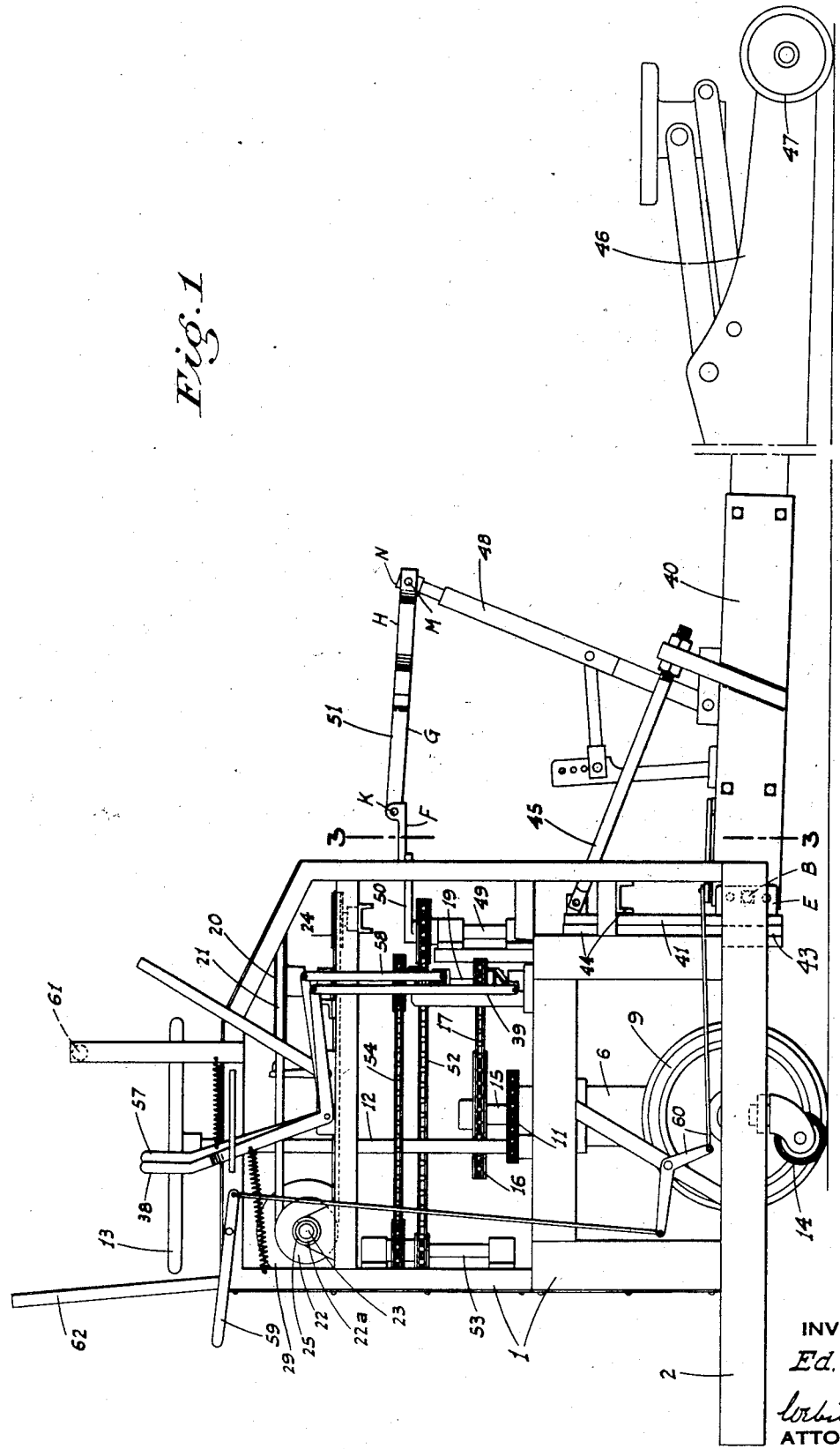
Figure 1 is a side elevation of the improved truck, the load lifting and carrying unit being here shown as a hydraulic vehicle jack.

Referring now more particularly to the characters of reference on the drawings, and particularly at present to the arrangement shown in Figs. 1 to 5, the power unit of the truck comprises a substantially rectangular upstanding framework 1 which includes side base beams 2 extending rearwardly from the upstanding portion of the frame, and supporting an operator platform 3. The frame also includes a pair of transversely spaced, centrally disposed longitudinal beams 4 some distance above the beams 2.

The beams 4 support a bearing block 5 in which is journaled a hub 6 which upstands from a differential housing 7 having a conventional axle and differential mechanism indicated at 8 therein, and which supports a pair of wheels 9. These wheels are spaced closer than the beams 2 and the other adjacent cross beams of the frame so that the wheels can swing freely about the hub as an axis.

Figure 2:
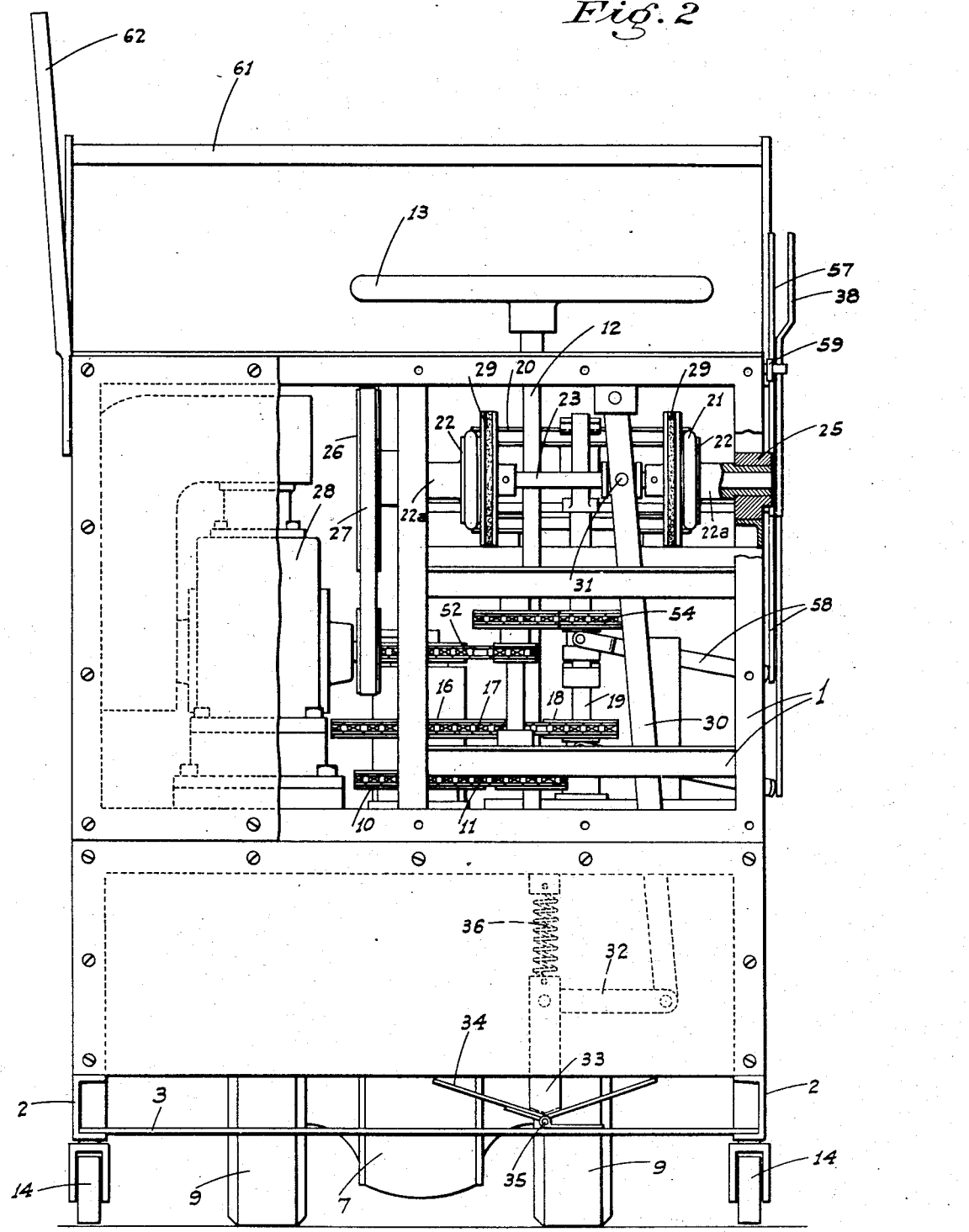
Figure 2 is a rear end view of the truck, one of the cover plates of the framework being partly broken away.

A sprocket wheel 10 is secured on the hub above the beams 4, which is connected by a chain drive 11 with an upstanding steering column 12 journaled in the frame 1, and having a steering wheel 13 on its upper end and above the frame in a position convenient to the occupant of the platform, as shown in Figs. 1 and 2. Since the wheel tread is comparatively narrow, castors 14 are mounted on the beams 2 to prevent possible lateral tilting and upsetting of the frame.

The drive shaft 15 of the differential mechanism 8 projects upwardly through the hub 6 in turnable relation thereto to a termination above the sprocket 10 and on its upper end carries a sprocket wheel 16. This sprocket wheel is connected by a chain 17 with another sprocket wheel 18 mounted on a countershaft 19 journaled in connection with the frame 1 adjacent its forward end. A pulley 20 is fixed on the upper end of the shaft 19 which is engaged by an endless belt 21, the opposed runs of the belt extending rearwardly from the pulley 20 over pulleys 22 turnable on a transverse drive shaft 23 journaled on the frame 1 adjacent its rear end. The belt passes forwardly from under the pulleys 22 and about a pair of direction changing cross-over pulleys 24 mounted on the frame below the pulley 20.

As shown in Fig. 2 the hubs 22a of the pulleys 22 are journaled in frame mounted bearings 25, while the shaft 23 turns and slides in the hubs, being supported thereby. On one end the shaft 23 carries a pulley 26 which is connected by a belt 27 with a gas engine 28 mounted on the frame on the corresponding side below said shaft (see Fig. 2).

Friction disc clutches 29 are associated with the pulleys 22 and shaft 23, one element of each clutch being fixed with the corresponding pulley while the other element is fixed on the shaft. The shaft is slid one way or the other to engage either clutch, by means of a laterally movable depending shift lever 30 which is pivoted at its upper end in connection with the frame, and intermediate its ends engages the shaft as at 31. At its lower end the lever is connected by a lateral link 32 with an arm 33 upstanding from and rigid with a double rocking pedal 34 pivoted centrally of its ends as at 35 on the platform 2. Depression of one end or the other of this pedal thus shifts the lever in one direction or the other and causes a corresponding shifting of the shaft 23 and the engagement of one of the clutches 22. The pedal unit is normally held in a neutral position by a tension spring 36.

It will thus be seen that the wheels 9 may be driven from the shaft 23 in either direction (by reversing the direction of drive of the belt 21 upon proper manipulation of the pedal 34), and the control of the direction of travel of the truck without any gear shifting may be effected easily and quickly by the occupant of the platform. At the same time the truck may be steered by turning the wheel unit about the upstanding shaft 15 as an axis, without interfering with the driving of the wheels. However, since the driving of shaft 19 is necessary for another use than the propulsion of the vehicle, as will be seen later, the sprocket wheel 18 is turnable on said shaft and is optionally connected in driving relation therewith by a clutch 37 (see Fig. 3). This clutch is controlled by the operator on the platform by means of a lever 38 pivoted on one side thereof (see Fig. 1), and is operatively connected to one element of said clutch by a suitable lever and linkage arrangement 39.

Figure 3:
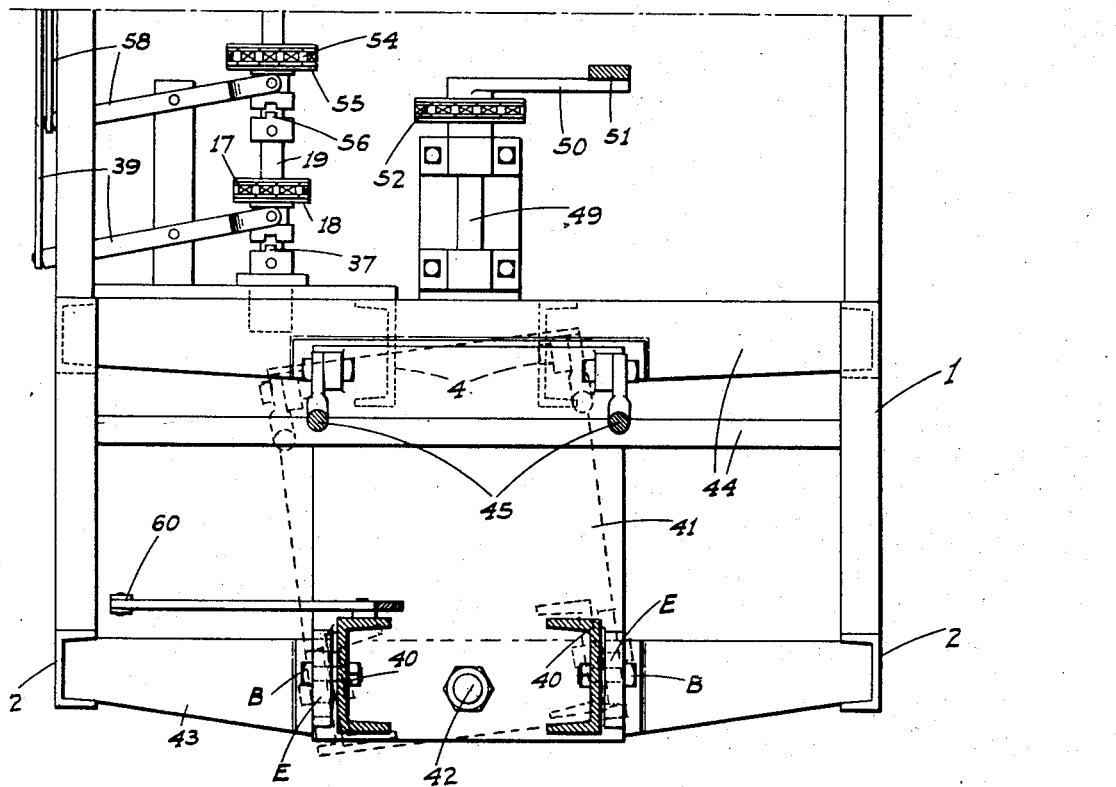
Figure 3 is a fragmentary transverse section on the line 3—3 of Figure 1, only those parts of the mechanism immediately adjacent the sectional plane being shown.
Figure 4:
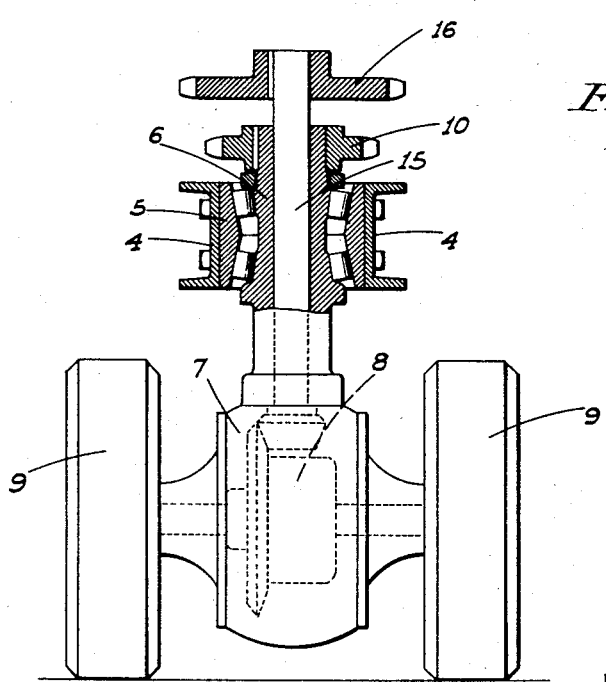
Figure 4 is a fragmentary transverse section showing the steerable truck propulsion unit.
Figure 5:
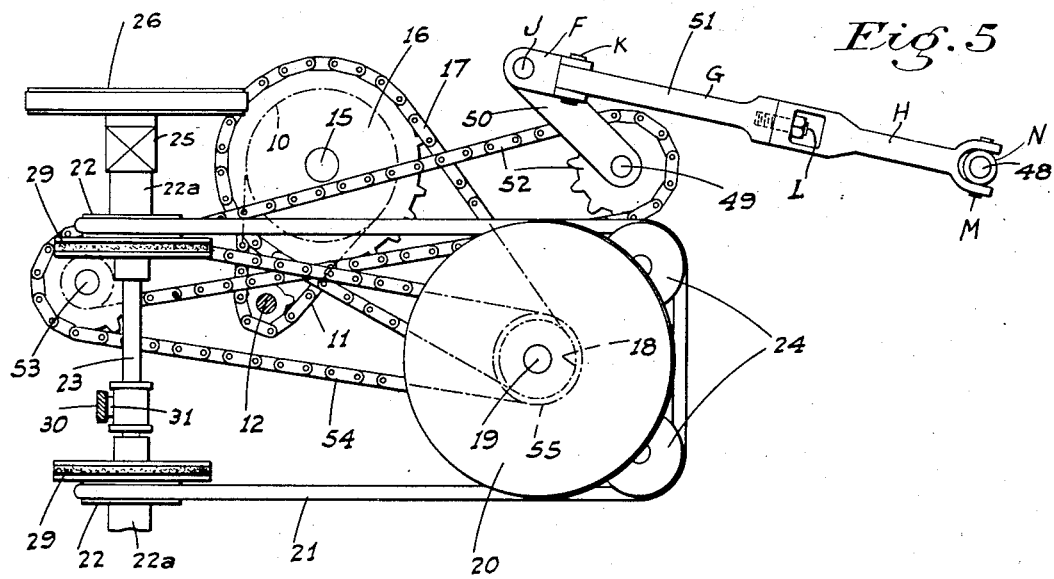
Figure 5 is a plan of the drive mechanisms for the propulsion and lift control shafts.

The front or load lifting and carrying unit of the truck comprises side beams 40 substantially on a level with the base beams 2 and connected for vertical adjustment at their rear end by bolts B to ears E projecting forwardly from an upstanding transverse plate 41 (see Fig. 3). This plate is centrally disposed and is swivelly connected adjacent its lower end to the frame 1 by a longitudinal pivot bolt 42 passing through said plate and through the bottom cross beam 43 of the frame. Adjacent its upper end the plate is confined between transversely extending guide members 44 rigid with the frame 1, and above said members is additionally connected to the beams 40 by adjustable tension braces 45. In the embodiment of the invention herein illustrated these beams are connected to or rigid with the frame of a hydraulic vehicle jack of conventional character indicated generally at 46, and which is supported at its forward end by rollers 47 which constitute the front wheels of the truck. Any other suitable form of load engaging device may, however, be substituted for the jack without altering the spirit of the invention or any actual constructional features thereof. In any event the jack or such other load engaging device includes a hydraulic pump operated as usual by an upstanding longitudinally oscillating lever 48 disposed centrally of the device in a transverse plane. This lever is oscillated in the following manner:

A vertical shaft 49 is mounted on the frame 1 adjacent its forward end and in the transverse plane of said lever, and carries a crank arm 50 connected to the upper end of said lever by a link unit 51. This unit, while inflexible longitudinally, is constructed so that it may flex in a vertical as well as a horizontal plane, so as to conform both to differences in level had between the crank arm and the upper end of the lever with the arcuate movement of the latter and to any difference in alinement of the lever and shaft 49 had with any relative lateral tilting of the front and rear units of the truck about the pivot bolt 42. The flexing of link unit 51 is made possible by the specific construction disclosed in Fig. 5, from which it will be seen that said unit comprises three longitudinally alined sections F, G, and H. Section F is connected to crank 50 by a vertical pin J and to adjacent section G by a transverse pivot pin K; while sections G and H are connected by a longitudinally extending pivot screw L. Section H is connected to lever 48 by transverse trunnions M parallel to pin J and mounted in a collar N turnable on said lever. The shaft 49 is connected by a chain drive 52 with a counter-shaft 53, which in turn is connected with the shaft 19 by another chain drive 54 which includes a sprocket wheel 55 turnable on said shaft. This sprocket wheel 55 is adapted for connection with the shaft 19 in driving relationship by a clutch 56. This clutch is controlled by a hand lever 57 preferably mounted in common with the lever 38 as indicated in Fig. 1, and which is operatively connected with said clutch 56 by a suitable lever and link arrangement 58.

It will thus be seen that by reason of the clutches 37 and 56 the truck may be propelled and the pump operated either independently or simultaneously as may be desired, and it will be noted that it is immaterial as far as the operation of the pump is concerned whether the shaft 19 is turning in one direction or the other, or in other words whether the truck is going forward or backing up.

A lever 59, for releasing the hydraulic fluid in the jack, is mounted on the frame 1 on the same side as the levers 38 and 57, and is connected to the fluid release mechanism by a suitable link and lever arrangement 60.

A hand rail 61 for the convenience of the operator extends across the frame above the steering wheel 13, while an upstanding grip bar 62 may be mounted on the frame 1 on one side thereof.

The adjustable mounting of the frame beams 40 enables the clearance of said beams from the ground or floor to be altered as operating conditions may require.

Figure 6:
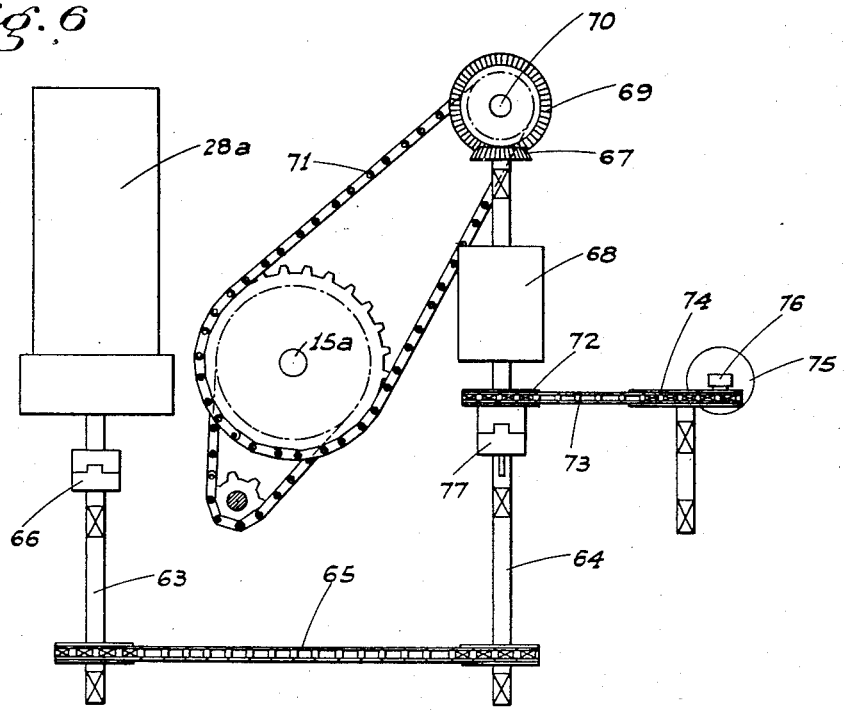
Figure 6 is a diagrammatic plan of a modified form of drive mechanism.

A driving or operating arrangement, giving the same result as above but designed for heavy duty work and enabling a vertical-stroke hydraulic pump rod to be used, is illustrated diagrammatically in Fig. 6. In this case the transversely extending drive shaft 63 from the engine 28a is parallel to a forwardly disposed counter-shaft 64 and is connected therewith by a chain drive 65 or the like, a clutch 66 being interposed in the shaft 63. The shaft 64 drives a bevel pinion 67 through a conventional change-speed transmission unit 68 which, as usual, includes a reverse gearing and a neutral or idle position. This pinion drives a bevel gear 69 mounted on a vertical shaft 70. A chain drive 71 connects the shaft 70 and the vertical wheel-drive shaft 15a. The wheels may therefore be driven in opposite directions and at different speeds selectively as may be desired with a constant engine speed. A sprocket wheel 72 on the shaft 64 ahead of the transmission is connected by a chain drive 73 with another sprocket wheel 74 which overhangs the hydraulic pump 75 of the load carrying unit and operates the same by a depending rod 76 having crank connection with said sprocket 74. The sprocket 72 is turnable on the shaft 64 and is adapted to be connected in driving relation therewith by a manually operable clutch 77.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An industrial truck comprising a power unit, drive wheels supporting the same, a load carrying unit, wheels supporting the same, the units being disposed in end to end relation and the load carrying unit including relatively low longitudinal side beams, a transverse plate rigid with and upstanding from the beams, at one end thereof, a transverse beam on the power unit at the adjacent end and engaging one side of the plate adjacent the lower end thereof, frame elements on the power unit above and rigid with said transverse beam, a longitudinal pivot bolt connecting the beam and plate, and transverse members secured on said elements and straddling the plate above the beam in guiding relation.

2. An industrial truck comprising a wheel supported power unit, a wheel supported load carrying unit, means connecting the units in close coupled longitudinally alined relation and arranged to hold the units against relative movement in a longitudinal vertical plane as well as a horizontal plane while allowing of relative tilting of the units in a transverse vertical plane; said load carrying unit including a hydraulic lifting device having an upstanding lever to operate said device and adapted for reciprocation in a plane lengthwise of the truck, a rotary power actuated member on the power unit, and a connecting link between the member and lever to reciprocate the latter upon rotation of said member and arranged so as to be longitudinally inflexible but capable of flexing in a transverse vertical plane as well as a horizontal plane.

3. An industrial truck comprising a wheel supported power unit, a wheel supported load carrying unit, means connecting the units in closed coupled longitudinally alined relation and arranged to hold the units against relative movement in a longitudinal vertical plane as well as a horizontal plane while allowing of relative tilting of the units in a transverse vertical plane; said load carrying unit including a hydraulic lifting device having an upstanding lever to operate said device and adapted for reciprocation in a plane lengthwise of the truck, and power means to reciprocate the lever from the power unit irrespective of lateral tilt of the units.

4. In an industrial truck, a pair of drive wheels, a vertical drive shaft therefor, a vertical countershaft, disengageable drive connections between the shafts, a horizontal power shaft, a pair of pulleys turnable on the power shaft, a pair of clutches each having one element fixed on the power shaft and the cooperating element fixed with a corresponding pulley, means to shift both clutches simultaneously to engage one clutch and disengage the other, a pulley on the countershaft, the first named pulleys being tangent to lines which form tangents at opposite sides of the last named pulley and the latter being in a plane which passes through one edge of each of the first named pulleys, and an endless belt passing about the pulleys.

5. An industrial truck comprising a wheel supported power unit, a load carrying unit beyond one end of the power unit and including a relatively low frame, wheels supporting said frame adjacent its end furthest from the power unit, and connecting means between the units comprising a member mounted on the power unit at said one end, side ears on said member, vertically adjustable bolt connection means between the ears and frame and adjustable diagonal braces between the frame and said member above the ears.

6. A structure as in claim 5 with means mounting said member on the power unit for the transverse swivel movement and including, a pivot element extending lengthwise of the units.

EDWARD WOLF.